No. 833,788. PATENTED OCT. 23, 1906.
I. E. LEWIS.
EGG TESTER.
APPLICATION FILED JAN. 11, 1906.
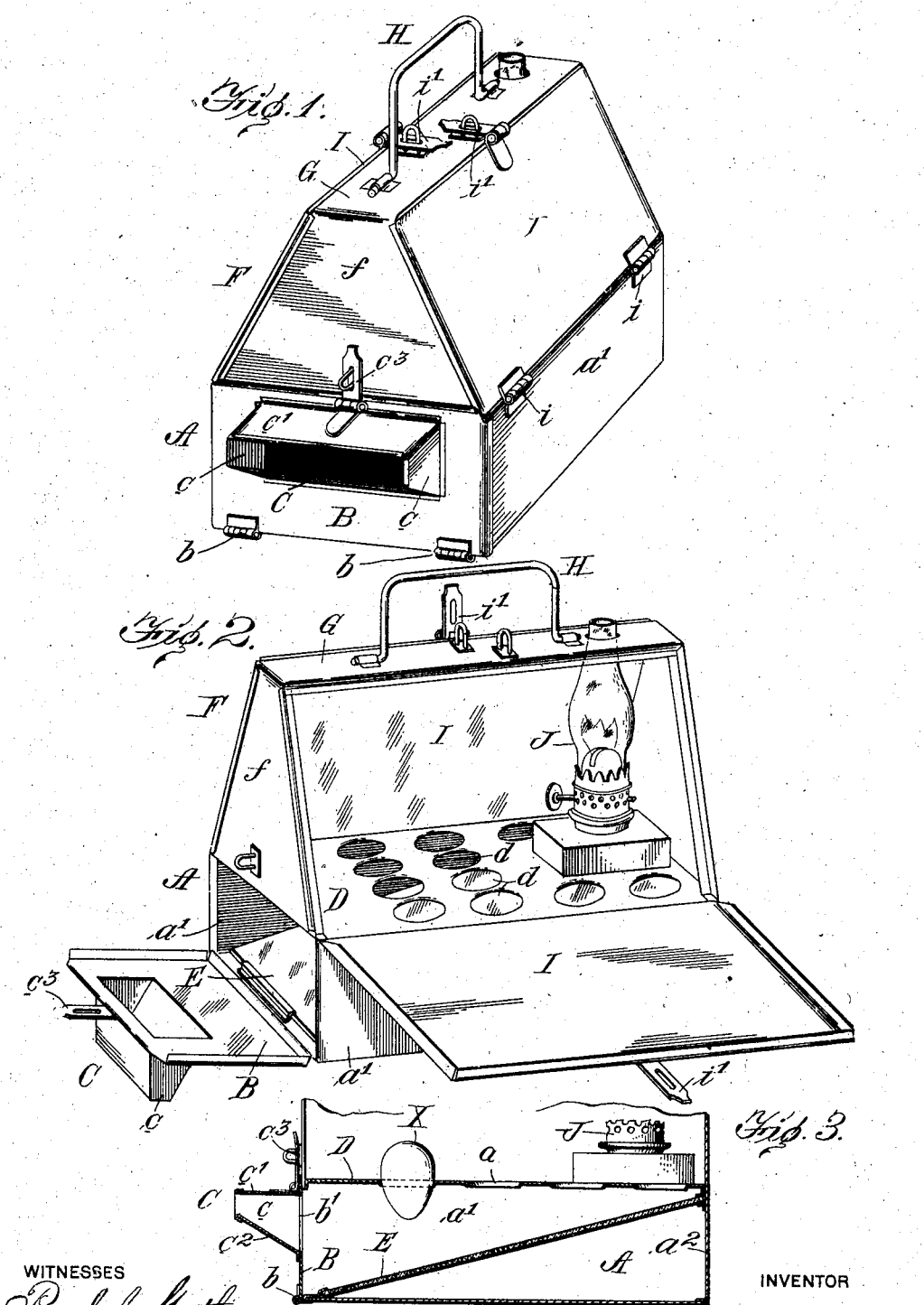
WITNESSES
Paul J. Gathmann
M. E. Burrell
INVENTOR
Iddo E. Lewis
BY HIS ATTORNEYS:
Baldwin Wight

UNITED STATES PATENT OFFICE.

IDDO E. LEWIS, OF GULFPORT, MISSISSIPPI, ASSIGNOR OF ONE-HALF TO JAMES C. LONGSTREET, OF JACKSON, MISSISSIPPI.

EGG-TESTER.

No. 833,788.   Specification of Letters Patent.   Patented Oct. 23, 1906.

Application filed January 11, 1906. Serial No. 295,600.

*To all whom it may concern:*

Be it known that I, IDDO E. LEWIS, a citizen of the United States, residing in Gulfport, in the county of Harrison and State of Mississippi, have invented certain new and useful Improvements in Egg-Testers, of which the following is a specification.

My invention relates to egg-testers of the class in which the eggs to be tested are supported within a box or casing containing a lamp or other illuminating device and a mirror and which is provided also with an aperture through which the reflected images of the eggs may be inspected. The arrangement is such that the images of the eggs in the mirror will enable the observer to distinguish those which are sound from those which are defective.

According to my invention I provide a horizontally-arranged egg-support having apertures through which the eggs may extend part way, one part of each egg being above the support, while the other part is below it. The upper part of the casing has a general triangular shape in cross-section. The two ends of the upper section are preferably made straight or vertical, while the sides are inclined and are preferably hinged at their lower ends so that they may be thrown back to expose the interior of the casing and to facilitate the handling of the eggs. A lamp is arranged in the upper section of the casing near one end thereof and shines directly on the eggs and also illuminates the interior of the casing-section in such manner that its light is reflected upon the eggs and subjects them to intense light, which will clearly reveal their contents. The lower portion of the casing is rectangular in outline, and it contains within it a mirror arranged at an angle below the egg-support. At one end this section of the casing is provided with an opening to enable the observer to inspect the interior. This opening is surrounded on the outside by a casing having an inclined bottom arranged in such manner that the mirror may be inspected from end to end, and thus all the eggs may be simultaneously viewed. The end of the casing in which the inspection-opening is formed is hinged, so that the interior of the casing may be readily reached to permit the eggs to be handled from below.

In the accompanying drawings, Figure 1 is a perspective view of my improved egg-tester. Fig. 2 is a perspective view thereof with one of the inclined sides of the upper section and one end of the lower section thrown back on their hinges. Fig. 3 is a view, on a reduced scale and in longitudinal section, of the lower section of the casing and a portion of the upper section thereof.

The casing of my improved egg-tester is preferably constructed entirely of bright tin, although it may be made of other materials and bright surfaces of other kinds provided where needed.

The lower section A is of a general rectangular shape. The bottom $a$, sides $a'$, and end $a^2$ are rigidly connected, while the end B is hinged at $b$ and is formed with an opening $b'$, surrounded by a casing C, having straight sides $c$, a horizontal top $c'$, and an inclined bottom $c^2$. The hinged end B may be provided with fastening devices $c^3$ of any suitable construction.

The top D of the casing-section A is horizontally arranged and is rigidly attached to the sides $a'$. It is formed with openings $d$ to receive the eggs X to be tested. Any desired number of openings may be provided, and they are of sufficient size and so shaped as to permit the eggs to extend part way below the top D and to hold them steady in the manner shown in Fig. 3. Below the top D is arranged a mirror E, which extends from the upper end of the back piece $a^2$ to the bottom of the front end B, and it also extends from one side piece to the other. This mirror is arranged, preferably, at an angle of about thirty degrees, as shown; but this angle may be varied. It will be observed that the mirror can be seen from end to end by any one looking in through the opening $b'$.

The upper section F of the casing is in the form of a truncated pyramid. The ends $f$ are of a general triangular shape; but the upper apices of the triangles are truncated and join the narrow top G, to which a handle H is attached.

The sides I of the upper section are hinged at $i$ to the lower section of the casing and are provided with fastening devices $i'$, which may be used to lock them to the top piece G.

Within the upper section is a lamp J, which is supported by the top piece D midway between the opposite sides I and near the rear end of the casing. A candle, electric lamp, or other illuminating device may be used in place of the lamp. The lamp-chimney, it will be observed, extends through the top piece G.

As before stated, I prefer to construct the casing entirely of bright tin. This affords reflecting-surfaces throughout the entire casing of the interior; but the latter may be made of other material, and suitable reflecting-surfaces may be provided wherever needed. Such surfaces are particularly desirable on the interior of the sides I of the upper section and the sides a' of the lower section. While I have described the casing as being formed in two sections, it may be constructed as a single casing divided into two parts by the partition D.

In using my invention it will be understood that the eggs to be tested are placed in the apertures d, while one or both of the sides I are thrown open in the manner indicated in Fig. 2. At this time also the end B of the lower section may be opened and the eggs may, if desired, be handled from below in order to place them in correct position for testing. After the eggs are all placed and the lamp is lighted the casing is closed in the manner indicated in Fig. 1, and then the eggs may be tested by looking through the opening b' at the mirror E, in which the images of the eggs are reflected. These images will not only show the outlines of the eggs, but their color and general condition. Clear sound eggs will appear as such in the mirror, while eggs containing defects will exhibit such defects in the mirror. Each image may be inspected critically; but those skilled in the use of my invention will be able to quickly take in at a glance the images of all the eggs, and any egg containing a defect will at once arrest the eye of the observer. If defective eggs are discovered, one of the hinged sides may be thrown open, and this egg may be removed, or it may be noted which of the eggs are defective and the side need not be opened until all of the defective eggs are noted. After the eggs have been thus tested the end B may be thrown open and the eggs may be lifted and at the same time handled from above, so as to be readily removed.

I claim as my invention—

1. An egg-tester, comprising a lower section having an inspection-opening at one end, a mirror within the lower section arranged at an angle to the inspection-opening, an upper section comprising ends rigidly attached to the lower section and connected by a narrow centrally-arranged top, a handle attached to the top, inclined sides hinged to the casing and having reflecting-surfaces on their inner faces, a lamp or similar illuminating devices within the upper section of the casing between the reflecting-surfaces, and a perforated egg-supporting partition between the casing-sections.

2. An egg-tester comprising a lower section, having a hinged door at one end provided with an opening surrounded by a casing having an inclined lower wall, a mirror within the lower section arranged at an angle to the lower wall of said casing which surrounds the opening, an upper casing-section having hinged inclined sides provided on the interior with reflecting-surfaces, a lamp or similar device arranged between the reflecting-surfaces, and a perforated partition on which the lamp is supported, and which separates the upper section of the casing from the lower section thereof.

In testimony whereof I have hereunto subscribed my name.

IDDO E. LEWIS.

Witnesses:
  EDWARD HAYES,
  ANNIE HEDERMAN.